United States Patent [19]

Fischer

[11] 4,134,183
[45] Jan. 16, 1979

[54] GRIPPING COLLAR

[76] Inventor: Walter Fischer, 2, chemin du Point du Jour, Morges, Vaud, Switzerland, CH-1110

[21] Appl. No.: 740,407

[22] Filed: Nov. 10, 1976

[30] Foreign Application Priority Data

Nov. 24, 1975 [CH] Switzerland .................. 15181/75

[51] Int. Cl.² ........................................... F16G 11/00
[52] U.S. Cl. ...................... 24/132 AA; 403/DIG. 7; 339/274
[58] Field of Search ......... 24/115 G, 132 R, 132 AC, 24/132 AB, 132 AA, 132 HA, 120; 403/DIG. 7; 339/274

[56] References Cited

U.S. PATENT DOCUMENTS

| 888,893 | 5/1908 | Hayes | 24/132 AA |
| 1,251,983 | 1/1918 | Lockwood | 403/DIG. 8 |
| 2,093,079 | 9/1937 | Hixon | 339/274 |
| 3,088,295 | 5/1963 | Haines | 63/20 |

FOREIGN PATENT DOCUMENTS 610301  2/1926  France .................. 24/115 G

Primary Examiner—Kenneth J. Dorner
Attorney, Agent, or Firm—Emory L. Groff, Jr.

[57] ABSTRACT

A gripping collar for electric cables and the like comprises coaxial pieces held axially together but rotatable relative to one another, the pieces having eccentric holes which define a passage through the collar. A cable or other member to be gripped can be inserted in the passage when the holes are aligned, and then gripped by relatively rotating the pieces.

6 Claims, 4 Drawing Figures

GRIPPING COLLAR

This invention relates to gripping collars.

Gripping collars are used in many applications. They are used notably to form an abutment on an elongated member such as a rod, to grip the end of a flexible tube onto a sleeve, and to axially secure electric wires or a cable in a plug or connector.

An object of the invention is to provide a gripping collar which is easy and inexpensive to manufacture and which can be easily and rapidly manipulated to provide a gripping action.

A gripping collar according to the invention comprises at least two discs of substantially the same diameter axially secured together and each having an eccentric hole, and means for coupling the discs to allow relative rotation of the discs.

Two embodiments of the invention are shown, schematically and by way of example, in the accompanying drawings, in which.

Figure 1:
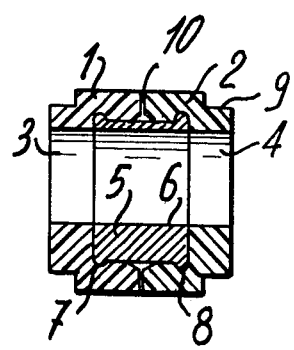
FIG. 1 is an axial cross-section of the first embodiment.

The gripping collar of FIG. 1 comprises two coaxial discs 1 and 2 of the same diameter, each having an eccentric circular hole 3, 4 respectively. The discs 1 and 2 are identical and each have a generally cylindrical peripheral wall engaging on a generally cylindrical disc or sleeve 5 also having an eccentric hole 6.

The discs 1 and 2 and sleeve 5 are able to turn relative to one another, about their common axis, but are held axially to form an assembly by formations comprising two annular peripheral ribs 7, 8 at the ends of sleeve 5 and which engage in two corresponding grooves in the discs 1, 2.

The pieces 1, 2 and 5 may be made of a synthetic resin having a sufficient elasticity to permit assembly by simply pressing the pieces axially until the ribs 7 and 8 engage in their grooves.

On its outer end face, each disc 1, 2 has a hexagonal nut-like profile 9 which enables the use of spanners to turn the discs.

The facing edges of the cylindrical walls of the discs 1, 2 have interengaging radial projections 10 forming means opposing unwanted relative rotation of the discs.

Figure 2:
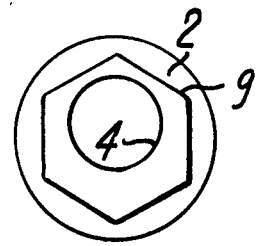
FIG. 2 is an end view of the collar of FIG. 1.

FIG. 2 is an end view of the collar shown in FIG. 1, in which the three eccentric holes 3, 4 and 6 are aligned and form a passage of maximum cylindrical section through the collar.

Figure 3:
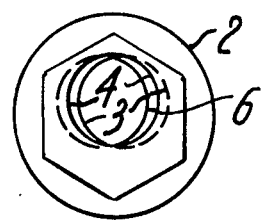
FIG. 3 is a schematic view illustrating relative movement of the parts of the collar of FIGS. 1 and 2 to obtain a gripping effect.

FIG. 3 illustrates the reduction of section of the passage through the collar after rotation of the discs 1 and 2 relative to one another from the position of FIGS. 1 and 2. It is clear that this reduction of the section of the passage enables a gripping effect to be obtained on a cylindrical object, such as an electric cable, which is received in the passage.

Figure 4:
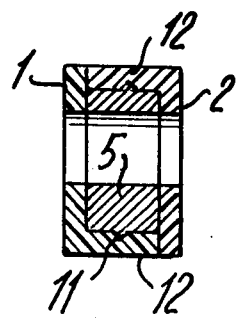
FIG. 4 is an axial cross-section of a second embodiment.

FIG. 4 is an axial cross-section of a second embodiment of collar comprising, as before, two identical discs 1 and 2 and a sleeve 5 disposed between the discs. However, the sleeve 5 has only a single formation comprising a peripheral rib 11 which engages in corresponding grooves in arms 12 of the discs 1 and 2. Each disc 1, 2 has, for example, three such arms 12 spaced about its periphery. These arms are relatively narrow so that there is, between the adjacent arms of each disc, enough space to receive the arms of the other disc while leaving a sufficient angular play between the discs 1 and 2 to provide a gripping effect by relative rotation of the eccentric holes.

In this embodiment, the maximum relative angular displacement of the discs is thus limited as a function of the number and the width of the arms 12.

As a variation of the second embodiment, each disc 1, 2 could have only two diametrically opposite arms.

Of course, numerous other variations can be made to the two described embodiments, notably it would be possible to provide a collar having only two coaxial pieces angularly movable relative to one another and each having an eccentric hole. Likewise, the axial securing together of the pieces could be achieved in any suitable known manner. The sleeve 5 could also have a peripheral groove or grooves in which inner ribs of the discs 1 and 2 would engage, or even simply one or several embossments provided on each disc.

It is noted that as the discs 1 and 2 of both described embodiments are identical, the manufacturing cost of the assemblies is low.

I claim:

1. A gripping collar for elongated members, namely electric wires, comprising first, second and third discs, each said disc having an eccentric hole extending through out its entire axial length, said third disc disposed internally of said first and second discs, means securing said discs in axial relationship to each other to provide a unitary assembly of said three discs in axial juxtaposition with opposed faces of adjacent discs remaining in substantial abutment at all times, said securing means including a formation on each of said three discs concentrically mating with a formation on another of said discs with said mating formations disposed in a common plane normal to the longitudinally axis of the collar to preclude axial separation of said discs but allowing relative rotation thereof and thereby allowing lateral shifting of all three said holes relative one another to effect a gripping force on said wires when they are inserted in said eccentric holes.

2. A gripping collar according to claim 1, wherein all of said disc holes are of equal diameter.

3. A gripping collar according to claim 2, wherein the center point of all of said holes are disposed an equal distance from the center axis of said collar whereby, all said holes are axially aligned when said three discs are rotated to one particular position relative one another.

4. A gripping collar according to claim 1, wherein said securing means formations comprise two circumferential ribs on said third disc with each of said first and second discs having an annular groove within its eccentric hole for engagement with said ribs.

5. A gripping collar according to claim 1, wherein said securing means formations comprise a circumferential rib on said third disc with each of said first and second discs having an annular groove within its eccentric hole for engagement with said rib.

6. A gripping collar according to claim 1, wherein said first and second discs include cooperating means for preventing unwanted rotation of said discs relative to one another.

* * * * *